NATHANIEL THOMAS, OF DIXFIELD, MAINE.

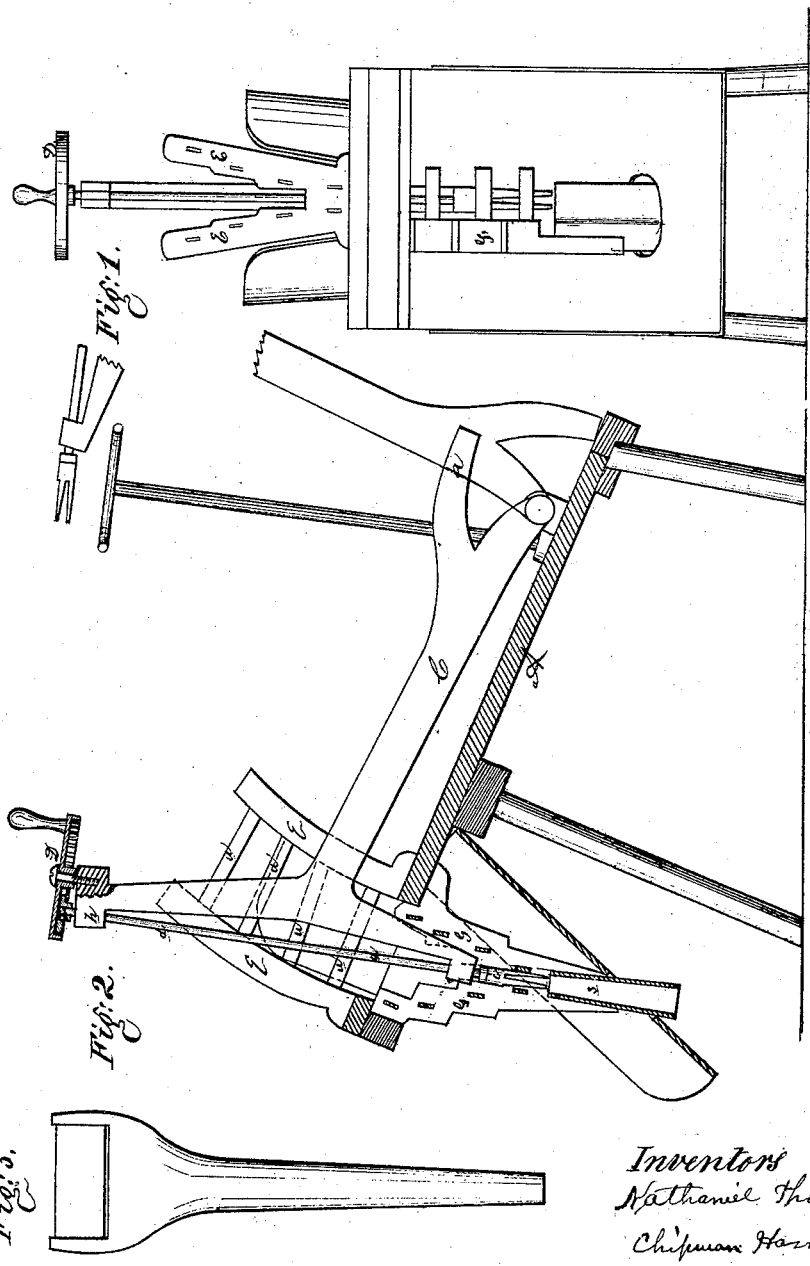

Letters Patent No. 88,755, dated April 6, 1869.

IMPROVED APPLE-SLICER AND CORER.

The Schedule referred to in these Letters Patent and making part of the same.

*To all whom it may concern:*

Be it known that I, NATHANIEL THOMAS, of Dixfield, in the county of Oxford, and State of Maine, have invented a new and valuable Improvement in Devices for Slicing and Coring Apples; and I do hereby declare that the following is a full, clear, and exact description of the construction and operation of the same, reference being had to the annexed drawings, making a part of this specification, and to the letters and figures of reference marked thereon.

Figure 1 of the drawings is an end view of my device, and

Figure 2 is a longitudinal section thereof.

My device relates to inventions for removing the cores from apples, and cutting them in slices for drying or cooking; and It consists in constructing and arranging, in a novel manner, a series of devices, by which apples may be cored and sliced with greater perfection and dispatch than by any similar invention heretofore known.

The letter A, of the drawings, represents a frame, adjusted in a diagonal position, upon the top of which is hinged the bar C, in the manner shown on the drawings.

The hinged bar C is constructed in the form represented, the lower end having a fork or prong, $a$, which, when the bar is raised, rests upon the top of the frame, and holds the bar in a perpendicular position.

The cog-wheel and crank D is adjusted on the extreme upper end of the bar C, and is designed for use in rotating the spindle $d$, with which it is connected by the pinion $c$, affixed to the top of said spindle, in the manner shown.

The spindle $d$ works in openings made in the shoulders $h$, formed on the side of the upright part of bar C, and is actuated by its pinion, $c$, working in conjunction with the cogged wheel and crank, above mentioned.

The letter $i$ is the apple-holder, attached to the lower end of spindle $d$.

On the front side of the frame A, I attach the frame E, constructed in the form of a crotch, the office of which is to hold the slicing-knives next mentioned. These slicing-knives are marked $u$ on the drawings, and are arranged in the frame E, in such manner that their edges shall be turned upward, and thereby cut two sides of the apple in slices, when the apple-holder is forced downward with the apple thereon.

On the under side of frame A, and immediately opposite the frame E, and below an opening in frame A, of a size sufficient to fully connect the two, I affix another knife-holding frame, marked G.

The knives of this last-mentioned frame are adjusted on a line at right angles with the knives upon frame E, and serve to cut in slices the two sides of the apple, which were not sliced by the knives on frame E, upon the downward passage of the apple-holder.

The letter $s$ is a tube, through which the core of the apple drops from the apple-holder, after it has been sliced by the knives on frames E and G, the lower knives on said last-mentioned frame being so adjusted as to cut the core in two or more parts, and thereby release it from said holder.

I sometimes attach a wire to the front side of frame A, and arrange its lower end in such manner that it shall pass to the apple-holder, and serve as an auxiliary in releasing the apple-core from said holder.

This machine is operated as follows, namely:

I raise the bar C until it assumes a perpendicular position, its prong $a$ resting upon the rear of frame A. I then place the apple upon the holder $i$, and pare it in the usual manner of apple-paring machines. I next force the bar C downward. In its passage through the frames E and G, the apple is completely cut in slices, and finally the core is released and passed into the tube $s$.

What I claim as my invention, and desire to secure by Letters Patent, is—

An apple-slicer and corer, having frames A, E, and G, bar C, wheel and crank D, pinion $c$, spindle $d$, apple-holder $i$, and knives $u$, constructed and arranged substantially as specified.

In testimony that I claim the above, I have hereunto subscribed my name, in the presence of two witnesses.

NATHANIEL THOMAS.

Witnesses:
S. FOLSOM,
F. J. FOLSOM.